US012799145B2

(12) United States Patent
Liu et al.

(10) Patent No.: US 12,799,145 B2
(45) Date of Patent: Nov. 17, 2026

(54) WATER-SOLUBLE Pd(II) COMPLEX, METHOD FOR SYNTHESIZING SAME, AND USE THEREOF AS CATALYTIC PRECURSOR

(71) Applicant: Yunnan Precious Metals Laboratory Co., Ltd, Kunming (CN)

(72) Inventors: Weiping Liu, Kunming (CN); Juan Yu, Kunming (CN); Li Chen, Kunming (CN); Anli Gao, Kunming (CN); Yunsheng Dai, Kunming (CN); Feng Liu, Kunming (CN); Jing Jiang, Kunming (CN); Jiyang Xie, Kunming (CN); Hao Zhou, Kunming (CN); Qiaowen Chang, Kunming (CN); Caixian Yan, Kunming (CN)

(73) Assignee: Yunnan Precious Metals Laboratory Co., Ltd, Kunming (CN)

( * ) Notice: Subject to any disclaimer, the term of this patent is extended or adjusted under 35 U.S.C. 154(b) by 509 days.

(21) Appl. No.: 18/508,226

(22) Filed: Nov. 13, 2023

(65) Prior Publication Data

US 2024/0092814 A1 Mar. 21, 2024

Related U.S. Application Data

(63) Continuation of application No. PCT/CN2023/074256, filed on Feb. 2, 2023.

(30) Foreign Application Priority Data

May 18, 2022 (CN) ........................ 202210548249.0

(51) Int. Cl.
*C07F 15/00* (2006.01)
*B01J 23/44* (2006.01)

(52) U.S. Cl.
CPC .......... *C07F 15/0066* (2013.01); *B01J 23/44* (2013.01)

(58) Field of Classification Search
CPC ........................................ B01J 23/44
USPC ........................................ 556/40
See application file for complete search history.

(56) References Cited

PUBLICATIONS

Zadesenets Journal of Solid State Chemistry 199 (2013) 71-77.*
Nakamura et al., The Journal of Physical Chemistry, vol. 78, No. 21, pp. 2136-2140.*

* cited by examiner

*Primary Examiner* — Ana Z Muresan

(57) ABSTRACT

A water-soluble Pd(II) complex, a synthesis method thereof and use thereof as a catalytic precursor, wherein the complex has a chemical name ammonium dinitrooxalato palladium (II), and a molecular formula of $(NH4)_2[Pd(NO_2)_2(C_2O_4)]nH_2O$.

3 Claims, 4 Drawing Sheets

WATER-SOLUBLE Pd(II) COMPLEX, METHOD FOR SYNTHESIZING SAME, AND USE THEREOF AS CATALYTIC PRECURSOR

CROSS-REFERENCE TO RELATED APPLICATIONS

The present application is a continuation application of PCT application No. PCT/CN2023/074256 filed on Feb. 2, 2023, which claims the benefit of Chinese Patent Application No. 202210548249.0 filed on May 18, 2022. The contents of all of the aforementioned applications are incorporated by reference herein in their entirety.

TECHNICAL FIELD

The present disclosure relates to a water-soluble Pd(II) complex, a method for synthesizing same, and a use thereof as a catalytic precursor. The water-soluble Pd(II) complex does not contain Cl, P, S, Na, K and other elements harmful to catalysis, and belongs to the field of chemistry and chemical engineering.

BACKGROUND

Palladium (Pd) is one element among platinum group metals, and its unique d electronic structure endows supported palladium-based catalysts with excellent catalytic performance. Palladium-based catalysts have been widely used in petrochemical, pharmaceutical and fine chemicals, volatile organic chemicals and automobile exhaust purification.

At present, chemical impregnation is a mainstream method for preparing supported palladium-based catalysts. The main process includes carrier selection and pretreatment, liquid phase loading, drying and hydrogen reduction/thermal decomposition. The carriers can be activated carbon, alumina, silica or titania. The liquid phase loading, a key step of the chemical impregnation process, involves the selection and use of a catalytic precursor. The catalytic precursor, as a soluble palladium compound, is the source of active ingredients for the supported palladium-based catalysts. A large number of studies reveal that the composition, structures and physicochemical properties of the precursor have important effects on the performance of the resulting catalyst. Catalysts for different purposes have certain requirements for the composition and structures of the precursor.

At present, the palladium catalytic precursors commonly used in industry are palladium chloride $PdCl_2$, a palladium nitrate $Pd(NO_3)_2$ solution (containing 10% nitric acid), palladium acetate $Pd(OAc)_2$, and palladium acetylacetonate $Pd(acac)_2$. Palladium chloride and palladium acetylacetonate are mainly used in the production of Pd/C catalysts. However, for the production of automobile exhaust gas purification catalysts (Pd—Rh-rare earth oxide/$Al_2O_3$) and VOCs purification catalysts (Pd—Pt/$Al_2O_3$ and Pd—Pt/$TiO_2$), a palladium nitrate solution is usually adopted as a catalytic precursor. As for the preparation of Pd/$Al_2O_3$ catalyst (also known as adsorbent) for ultra-deep desulfurization of benzene in cyclohexane industry, palladium acetate is preferred. This is because the use of chlorine-containing precursors will cause residual chloride ions in these three types of catalysts, which significantly reduce the high temperature resistance and lifetime of the catalysts.

Palladium nitrate is unstable in water and quickly decomposes into solid palladium oxide. But it is only stable in high concentration of nitric acid media. Therefore, palladium nitrate is sold in the market as a solution of 10% nitric acid. Palladium chloride is insoluble in water, and hydrochloric acid is required to dissolve it before use. Both hydrochloric acid and nitric acid are strong acids and at higher concentrations they will corrode carriers such as alumina and titania, destroy the modified surface structure of the carriers. As a result, the loading efficiency and catalytic activity will be largely compromised. Moreover, acid mist containing nitride, chlorine and hydrochloric acid will be discharged from the decomposition of the palladium nitrate solution and palladium chloride during the drying step and hydrogen reduction/thermal decomposition step when these two palladium compounds are used as the precursors, which is not conducive to clean production.

Palladium acetate and palladium acetylacetonate are also insoluble in water and need to be dissolved in organic solvents (such as acetone and chloroform) prior to the loading process. However, a large amount of flammable and volatile organic solvents used in industry will bring safety and environmental protection risks.

In addition, years of researches and applications of platinum group metal catalysts have shown that elements P and S have strong bonding ability with palladium, and are believed to be harmful to catalytic reactions due to phosphorus and sulfur poisoning effect. $Na^+$ and $K^+$ will migrate in catalysts at high temperatures, causing agglomeration and sintering of active metals. It is generally accepted that P, S, Na and K are harmful elements to supported palladium-based catalysts. Palladium compounds without Cl, P, S, Na and K elements are usually used as catalytic precursors in the industry, so that final catalyst products have no residue of Cl, P, S, Na and K.

Therefore, the development of a palladium compound as a catalytic precursor with high water solubility and without Cl, P, S, Na and K elements has important application prospects. Our team has synthesized a variety of such palladium compounds, including tetraamminepalladium nitrate $[Pd(NH_3)_4](NO_3)_2$ and ammonium bis(oxalato)palladium(II) dihydrate $(NH_4)_2[Pd(C_2O_4)_2]\cdot 2H_2O$. However, palladium-based catalysts prepared with such compounds as palladium catalytic precursors do not have superior performance. Meanwhile, the synthesis process of tetraamminepalladium nitrate involves the use of silver nitrate to precipitate chloride ions, and the manufacturing cost is high. $(NH_4)_2[Pd(C_2O_4)_2]\cdot 2H_2O$ is unstable, and will undergo the self-redox reaction even at room temperature, producing palladium metal. These shortcomings make them unable to meet the requirements of industrial applications.

SUMMARY

The objective of the present disclosure is to overcome the defects and shortcomings of palladium chloride, palladium nitrate solution and palladium acetate as well as palladium acetylacetonate used industrially as a catalytic precursor, and provide a high water-soluble Pd (II) complex without Cl, P, S, Na, K and other elements harmful to catalysis. This complex also has the advantages of superior application performance and controlled preparation cost, exhibiting great potential to replace existing palladium catalytic precursors.

The water-soluble Pd(II) complex of the present disclosure is ammonium dinitrooxalato palladium(II), with a molecular formula of $(NH_4)_2[Pd(NO_2)_2(C_2O_4)]\cdot nH_2O$, where n is the number of crystal water (n is usually 1 or 2), having the following chemical structure:

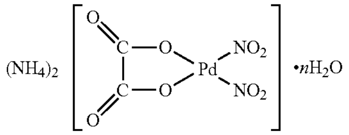

Compared with existing palladium catalytic precursors, the Pd(II) complex of the present disclosure has the following characteristics:

(1) It does not contain chlorine, sulfur, phosphorus, sodium or potassium harmful to the catalyst.

(2) It has high water solubility, a solubility of greater than 400 g/L (equivalent to 120 g Pd/L) in pure water at room temperature, and is very stable in water, as evidenced by the fact that the color of the solution does not change and no precipitation is observed when it is placed at room temperature for 2 days or kept at 60° C. for 5 hours. The pH of the solution at a concentration of 100 g/L is about 4-5.

(3) Its solid state is stable at room temperature. In the simulated air atmosphere and nitrogen, a thermal decomposition reaction can occur at a lower temperature (<190° C.) to generate palladium metal (see FIG. 2 and FIG. 3), which can reduce energy consumption in the thermal reduction or calcination process of catalyst preparation. Moreover, the decomposition products are Pd, $CO_2$, $N_2$ and $H_2O$, facilitating clean production and environmental protection.

Its thermal decomposition reaction is:

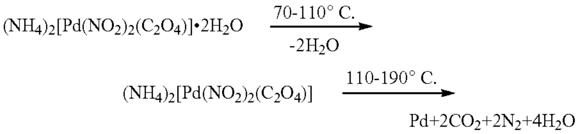

(4) The benzene desulfurization catalyst Pd/γ-$Al_2O_3$ prepared by aqueous phase loading using the Pd(II) complex of the present disclosure as a catalytic precursor, has a desulfurization effect that is significantly better than that of a commercial catalyst prepared by organic phase loading using palladium acetate as a precursor in the industry, and is also significantly better than that of a catalyst prepared under the same conditions with tetraamminepalladium dinitrate or ammonium bis(oxalato)palladium(II) dihydrate as a precursor. (see Example 3)

(5) The industrial VOCs purification catalyst Pd—Pt/γ-$Al_2O_3$ prepared by chemical aqueous phase impregnation using the Pd(II) complex of the present disclosure as a catalytic precursor has a catalytic oxidation efficiency for volatile organic compounds that is significantly higher than that of commercial catalysts prepared by a palladium nitrate solution as a catalytic precursor (see Example 4).

The synthesis of the Pd(II) complex of the present disclosure is accomplished by conducting chemical reactions according to the following reaction scheme:

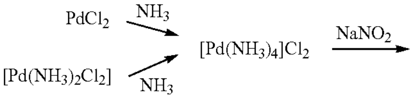

-continued

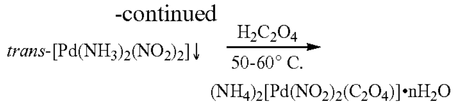

In general, the synthesis method may include the followings steps:

i) dissolving $PdCl_2$ or $[Pd(NH_3)_2Cl_2]$ in ammonium hydroxide to produce $[Pd(NH_3)_4]Cl_2$;

ii) adding excessive $NaNO_2$ into $[Pd(NH_3)_4]Cl_2$ to produce trans-$[Pd(NH_3)_2(NO_2)_2]$; and iii) dissolving trans-$[Pd(NH_3)_2(NO_2)_2]$ in an aqueous solution of oxalic acid to yield the water-soluble Pd(II) complex;

In certain embodiments, the method may include the following steps:

step I: Commercially available $PdCl_2$ or an intermediate product $[Pd(NH_3)_2Cl_2]$ from hydrometallurgy of palladium is selected as a starting material, which is dissolved in ammonium hydroxide at a temperature of 50-70° C., followed by concentrating the solution to nearly dry under reduced pressure at same temperature to remove possible excess ammonia. The resulting residue is dissolved in water and filtrated to obtain a yellowish $[Pd(NH_3)_4]Cl_2$ solution.

step II: 150%-250% of $NaNO_2$ in stoichiometry based on the amount of $[Pd(NH_3)_4]Cl_2$ is dissolved in water to prepare a nearly saturated solution, which is dropwise added to the $[Pd(NH_3)_4]Cl_2$ solution. The mixture solution is stirred at 50-70° C. for 1-2 hours and then cooled to room temperature, producing trans-$[Pd(NH_3)_2(NO_2)_2]$, a light yellow precipitate that is insoluble in water. The precipitate is filtered out, washed with water and ethanol respectively, to remove chloride ions and excess $NaNO_2$, and dried at 65° C. to obtain the product with a yield greater than 95%;

step III: To a certain amount of oxalic acid solution, 102% of trans-$[Pd(NH_3)_2(NO_2)_2]$ solid in stoichiometry is added and stirred for about 1 hour until almost all of trans-$[Pd(NH_3)_2(NO_2)_2]$ is dissolved in oxalic acid solution. The solution is cooled to room temperature and filtered to remove a small amount of insoluble residue to obtain a red solution which is freezing-dried or concentrated to dry under reduced pressure at 50° C. A orange-yellow target product, $(NH_4)_2[Pd(NO_2)_2(C_2O_4)]\cdot 2H_2O$, is finally synthesized with a yield greater than 97%.

The main reactions involved are:

First Step Reaction:

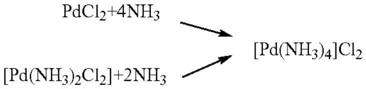

Second Step Reaction:

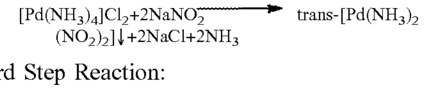

Third Step Reaction:

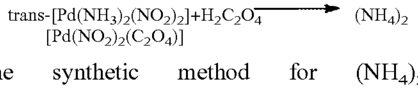

The synthetic method for $(NH_4)_2[Pd(NO_2)_2(C_2O_4)]\cdot 2H_2O$ provided by the present disclosure has the characteristics of mild reaction conditions, simple operation, and high yield and low cost, and is suitable for mass production.

DETAILED DESCRIPTION

Figure 1:
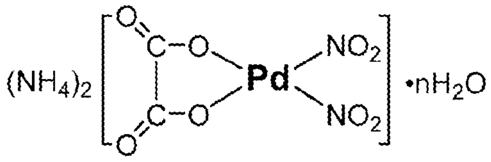
FIG. 1: the chemical structure of ammonium dinitrooxalatopalladium(II), a water-soluble Pd(II) complex of the present disclosure.
Figure 2:
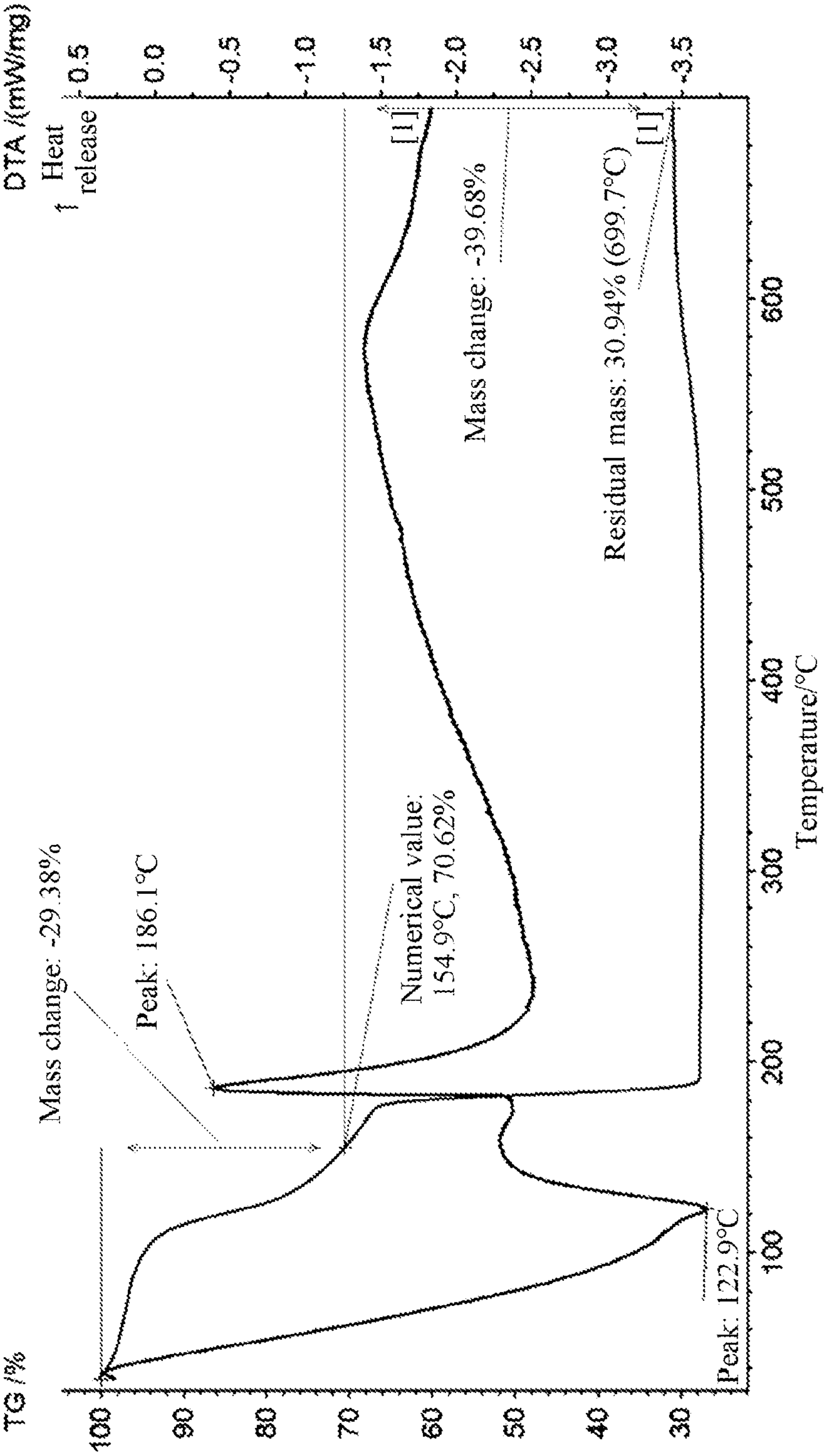
FIG. 2: a thermogravimetric curve (TG-DTA) of $(NH_4)_2[Pd(NO_2)_2(C_2O_4)]\cdot 2H_2O$ of the present disclosure in simulated air.
Figure 3:
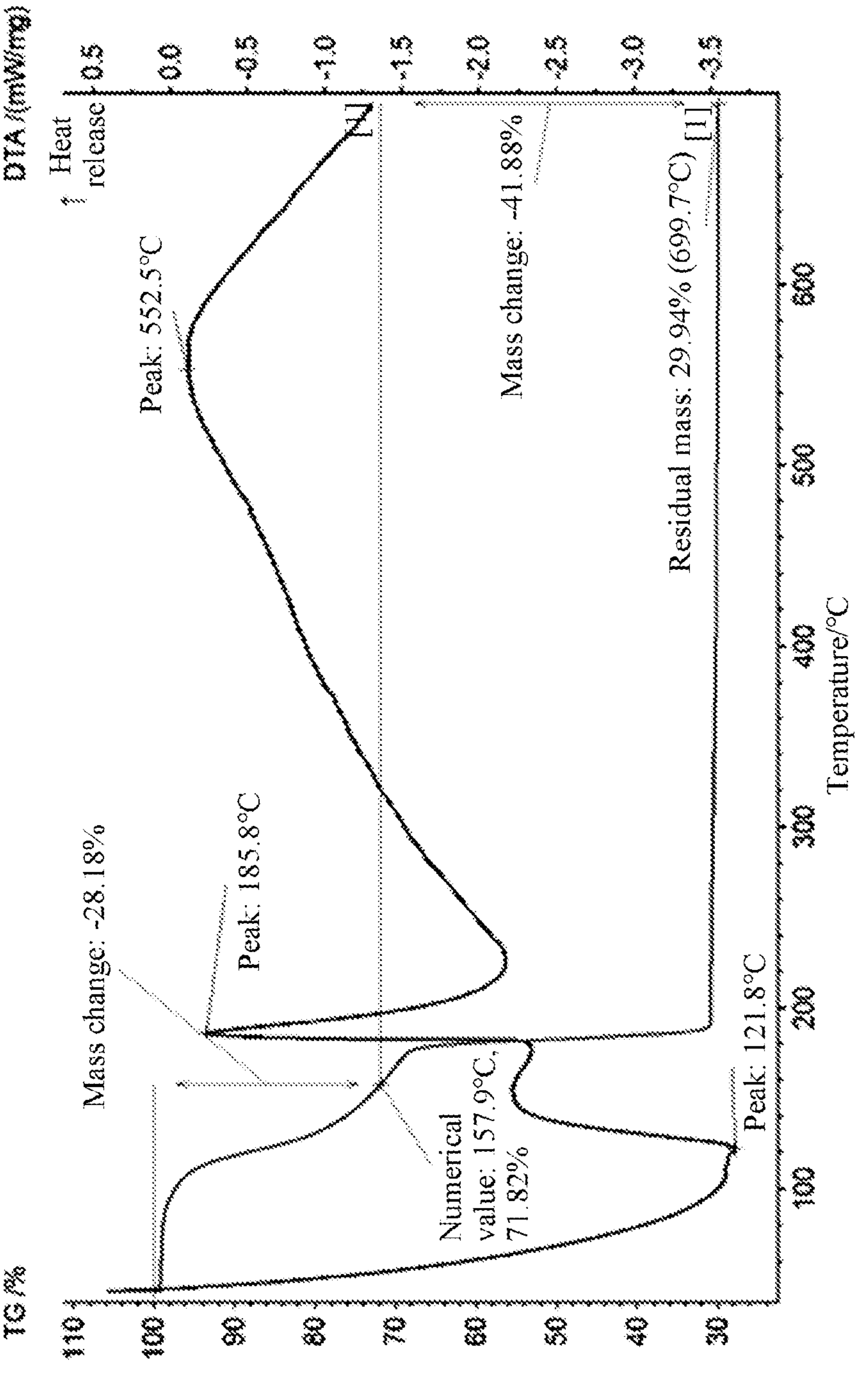
FIG. 3: a thermogravimetric curve (TG-DTA) of $(NH_4)_2[Pd(NO_2)_2(C_2O_4)]\cdot 2H_2O$ of the present disclosure in nitrogen.

Example 1: Synthesis of $(NH_4)_2[Pd(NO_2)_2(C_2O_4)]\cdot 2H_2O$ 100 g (564 mmol) of $PdCl_2$ was suspended in 200 mL of water and heated to 60° C., and 30% ammonium hydroxide was dropwise added under stirring until $PdCl_2$ was completely dissolved, with about 165 mL of ammonium hydroxide being used. In this case the final pH value of the solution was 10. The solution was concentrated to nearly dry under reduced pressure at 60° C. and 200 mL of water was added again to dissolve the residue to obtain a light yellow $[Pd(NH_3)_4]Cl_2$ solution. To which, 200 mL of aqueous solution containing 156 g (2256 mmol) of $NaNO_2$ was slowly added under stirring at 60° C. A yellow precipitate, trans-$[Pd(NH_3)_2(NO_2)_2]$, was precipitated slowly from the mixture solution. The reaction was continued for 1 hour and then cooled to room temperature. The product was filtered out and washed with 60 mL of water 3 times and then with 60 mL of ethanol once, and dried at 65° C. for 4 hours. 127 g of trans-$[Pd(NH_3)_2(NO_2)_2]$ was obtained, with a yield of about 97%.

65 g (516 mmol) of $H_2C_2O_4\cdot 2H_2O$ was dissolved in 400 mL of water at 55° C. and 122 g (526 mmol) of trans-$[Pd(NH_3)_2(NO_2)_2]$ solid was added under stirring. Reaction was allowed to continue for about 1 hour until almost all of trans-$[Pd(NH_3)_2(NO_2)_2]$ was dissolved and a red solution was formed. The solution was cooled to room temperature and a small amount of insoluble residue was removed by filtration, and the mother liquor was freeze-dried to obtain 184 g of $(NH_4)_2[Pd(NO_2)_2(C_2O_4)]\cdot 2H_2O$, an orange-yellow product, with a yield of about 98%.

Example 2: Synthesis of $(NH_4)_2[Pd(NO_2)_2(C_2O_4)]\cdot 2H_2O$ 50 g (237 mmol) of $[Pd(NH_3)_2Cl_2]$ was suspended in 100 mL water at 60° C., and 30% ammonium hydroxide was dropwise added under stirring until $[Pd(NH_3)_2Cl_2]$ was completely dissolved, with about 37 mL of ammonium hydroxide being used, and In this case the final pH value of the solution was 10. The solution was concentrated at 60° C. under reduced pressure to nearly dry, and 100 mL of water was added to dissolve the residue to obtain a light yellow $[Pd(NH_3)_4]Cl_2$ solution. To which, 100 mL of aqueous solution containing 65 g (948 mmol) of $NaNO_2$ was slowly added under stirring. A yellow precipitate, trans-$[Pd(NH_3)_2(NO_2)_2]$, was precipitated slowly from the mixture solution. The reaction was continued for 1 hour and then cooled to room temperature. The product was filtered out and washed with 30 mL of water 3 times and then with 30 mL of ethanol once, and dried at 65° C. for 4 hours. 53 g of trans-$[Pd(NH_3)_2(NO_2)_2]$ was obtained, with a yield of about 96%.

26.5 g (211 mmol) of $H_2C_2O_4\cdot 2H_2O$ was dissolved in 150 mL water at 55° C. and 50 g (215 mmol) of trans-$[Pd(NH_3)_2(NO_2)_2]$ solid was added under stirring. Reaction was allowed to continue for about 1 hour until almost all of trans-$[Pd(NH_3)_2(NO_2)_2]$ was dissolved and a red solution was formed. The solution was cooled to room temperature and a small amount of insoluble residue was removed by filtration, and the mother liquor was concentrated to dryness at 55° C. with a rotary evaporator to obtain 76 g of $(NH_4)_2[Pd(NO_2)_2(C_2O_4)]\cdot 2H_2O$, an orange-yellow product, with a yield of about 99%.

The sample of $(NH_4)_2[Pd(NO_2)_2(C_2O_4)]\cdot 2H_2O$ was submitted for composition and structural testing, and the results were as follows:

<1> Elemental analysis: Found: Pd, 29.4%; C, 6.62%, H, 3.38%; N, 15.4% (Calcd for Pd, 29.7%; C, 6.70%; H, 3.34%; N, 15.6%);

<2> IR ($cm^{-1}$, KBr): 3435 (s, v($H_2O$), 3232, 3177 (s, v($NH_4^+$)), 1612 (s, vas ($COO^-$)), 1401 (s, vs ($COO^-$)), 1137, 1311 (s, vs ($NO_2^-$)), 558 (w, v(Pd—O), 527 (w, v(w, v(Pd—$NO_2$);

<3> $^{13}C$ NMR ($D_2O$, ppm): 167 ($COO^-$);

<4> MS-ESI$^-$: m/e 140 [(M-2$NH_4$-2$H_2O$)/2, $^{104}Pd$]

The analysis results are well consistent with the chemical structure of $(NH_4)_2[Pd(NO_2)_2(C_2O_4)]\cdot 2H_2O$ of the present disclosure, as shown in FIG. 1.

Example 3: Preparation of Benzene Desulfurization Catalyst/Adsorbent with the Pd(II) Complex of the Present Disclosure as the Precursor and its Performance Tests 1. Preparation of Catalyst $Pd/Al_2O_3$ (1) Industrial Reference Catalyst 2.13 g of palladium acetate (equivalent to 1 g of Pd) was dissolved in 60 g acetone at 40° C. 100 g of $\gamma$-$Al_2O_3$ pellets with a diameter of about 2.3 mm was impregnated in the above solution for 2 h. Then the solids were filtered out, dried at 120° C. for 2 h, placed in a muffle furnace for calcinating at 400° C. for 4 hours, then reduced in an atmosphere of $H_2$ (20 ml/min) at 150° C. for 4 h, and cooled to room temperature to obtain an industrial reference catalyst $Pd/Al_2O_3$—OAc with a Pd content of 1%.

(2) Tested Catalysts 2.8 g of tetraamminepalladium dinitrate (Pd—S5) or 3.33 g of ammonium bis(oxalato)palladium(II)dihydrate (Pd—X5) or 3.4 g of the Pd(II) complex of the present disclosure (Pd—X6) was dissolved in 60 ml of water. 100 g of $\gamma$-$Al_2O_3$ pellets with a diameter of about 2.3 mm was impregnated in the above solution for 2 h. Then the solids were filtered out, dried at 120° C. for 2 h, placed in a muffle furnace for calcinating at 400° C. for 4 hours, then reduced in an atmosphere of $H_2$ (20 ml/min) at 150° C. for 4 h, and cooled to room temperature to obtain the tested catalyst/adsorbent $Pd/Al_2O_3$—S5, $Pd/Al_2O_3$—X5 and $Pd/Al_2O_3$—X6, respectively, all with a Pd content of 1%.

2. Desulfurization Activity Testing Method

Adsorption experiment was performed on a fixed-bed reactor. The experimental procedure was as follows: 70 g of adsorbent was placed in the thermostatic zone of a tube, and air in the tube was removed by injecting nitrogen gas. Thiophene benzene (50 ppm) was preheated to 170° C. in a heater and then was introduced to the reaction tube by using a flow pump. Benzene passed through an adsorption bed at a flow rate of 4 mL/min at 150° C. The effluent benzene was collected and analyzed on Shimadzu GC-2010 Plus gas chromatography equipped with a flame photometric detector (FPD). The formula for calculating the sulfur adsorption capacity is as follows:

$$q = \frac{v}{1000m}\int_0^t (C_0 - C_1)\,dt$$

where q is the adsorption sulfur capacity of the adsorbent (mg/g), v is the feed volume flow (mL/min) at any time (h), m is the weight of the adsorbent (g), Co and Ct are the initial concentration and instantaneous concentration of thiophene in benzene at a certain measured time, respectively.

3. Test Results

The fixed-bed adsorption activity test was carried out for four $Pd/Al_2O_3$ catalysts prepared by using different palladium catalytic precursors. The test results are shown in Table 1. The cumulative sulfur adsorption capacities of the four catalysts after 12 hours were measured to be 1.479, 1.518, 1.419, and 1.747 mg/g, respectively. $Pd/Al_2O_3$—X6 prepared with the Pd(II) complex of the present disclosure as a precursor has the best sulfur adsorption effect, which is better than that of the industrial benzene desulfurization catalyst, and also better than the catalyst prepared by using tetraamminepalladium dinitrate or ammonium bis(oxalato) palladium(II)dihydrate as a precursor.

TABLE 1

Amount of sulfur adsorbed by $Pd/Al_2O_3$ prepared by using different palladium precursors (mg Sulfur/g Catal)

| Sample number | 2 h | 4 h | 6 h | 8 h | 10 h | 12 h |
|---|---|---|---|---|---|---|
| $Pd/Al_2O_3$—OAc | 0.351 | 0.711 | 1.061 | 1.344 | 1.428 | 1.479 |
| $Pd/Al_2O_3$—S5 | 0.332 | 0.665 | 1.046 | 1.394 | 1.494 | 1.518 |
| $Pd/Al_2O_3$—X5 | 0.315 | 0.674 | 0.923 | 1.116 | 1.301 | 1.419 |
| $Pd/Al_2O_3$—X6 | 0.373 | 0.658 | 1.045 | 1.271 | 1.576 | 1.747 |

The catalyst samples were analyzed by XRD, XPS and TEM. The results show that compared with other three precursors, Pd—X6 as the catalytic precursor can enhance the interaction between Pd and Al in the $Pd/Al_2O_3$ catalyst, prevent the migration and agglomeration of Pd nanoparticles, increase the degree of dispersion, and thus improve the desulfurization activity.

Example 4: Preparation of VOCs Catalyst with Pd(II) Complex of the Present Disclosure as Precursor and Performance Evaluation 1. Main Raw Materials and Instruments and Equipment Ceramic carrier (300-mesh), La-modified alumina, rare earth composite oxide, ethanolamine hydroxyplatinum, palladium nitrate solution, the Pd(II) complex of the present disclosure (referred to as Pd—X6), acetic acid, barium hydroxide, hydroxyethyl cellulose, pseudo-boehmite, nitric acid, and deionized water. Balance, agitator, oven, muffle furnace, catalyst evaluation device SGB-2 #, MKS infrared analyzer, hole punch, etc.

2. Preparation of Catalyst Sample and Test Method for Catalytic Performance

1. Sample Preparation

Figure 4:
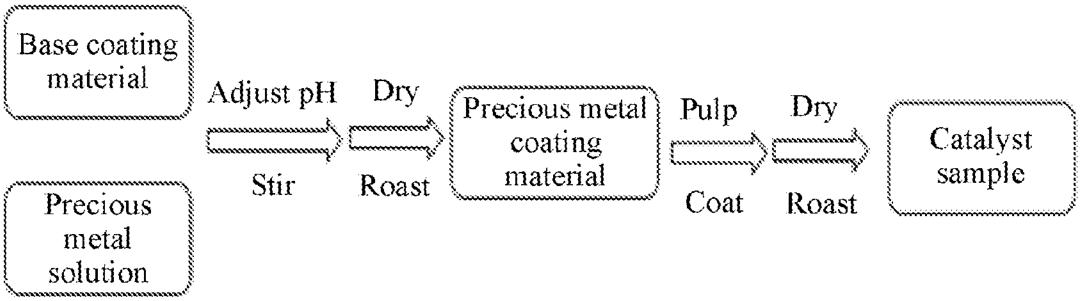
FIG. 4: a preparation flow chart of a catalyst sample of Example 4.

As shown in FIG. 4, the preparation of catalyst samples involves mixing the substrate coating material with a precious metal solution under stirring and adjusting pH of the mixture to a certain value, drying and roasting to generate a coating material containing platinum and palladium, and then pulping and coating the pulp on the porous surface of the ceramic carrier, and finally calcinating to obtain the catalyst sample. The precious metal loading capacity in this sample was 1.8 g/L and the mass ratio of Pt to Pd was 5.

2. Catalytic Activity Testing Method

The catalyst sample with a diameter of 1 inch and a height of 2 inch was intercepted, wrapped with asbestos cloth and loaded into a sample tube in the catalyst evaluation device SGB-2 #. The reaction chamber was heated, and the reaction gas was introduced when the temperature reached a value required for reaction. The test temperature started from 350 to 500° C. and the temperature gradient was 50° C. The flow rate of the reaction gas was calculated and determined according to a space velocity of 20,000/h, a carbon monoxide concentration of 4,000 ppm, a methane concentration of 1,000 ppm, a propane concentration of 1,000 ppm, an oxygen concentration of 5%, a water vapor concentration of 0-20%. The exhaust gas concentration level was detected in real time by using MKS infrared analyzer.

3. Test Results

The test data of the oxidative conversion of carbon monoxide, methane and propane by catalysts prepared by using two palladium precursors under the same conditions are shown in Table 2-Table 4.

(1) From the test data in Table 2, it can be seen that the catalysts prepared by using two different palladium compounds Pd—X6 and a palladium nitrate solution have an oxidative conversion rate of more than 99.5% for CO at different temperatures and water contents, which meets the technical requirements for industrial use.

TABLE 2

Oxidative conversion rate of CO over catalyst prepared by using two palladium precursors

| Reaction temperature/° C. | Water content/% | Conversion rate/% of CO Pd-X6 | Conversion rate/% of CO Palladium nitrate solution |
|---|---|---|---|
| 350 | 0 | 100 | 100 |
| | 5 | 100 | 100 |
| | 10 | 100 | 100 |
| | 15 | 100 | 100 |
| | 20 | 100 | 100 |
| 400 | 0 | 100 | 100 |
| | 5 | 100 | 100 |
| | 10 | 100 | 100 |
| | 15 | 100 | 100 |
| | 20 | 100 | 100 |
| 450 | 0 | 100 | 100 |
| | 5 | 100 | 100 |
| | 10 | 100 | 100 |
| | 15 | 100 | 100 |
| | 20 | 100 | 100 |
| 500 | 0 | 100 | 100 |
| | 5 | 100 | 100 |
| | 10 | 100 | 100 |
| | 15 | 100 | 100 |
| | 20 | 100 | 100 |

(2) The test data in Table 3 reveal that the oxidative conversion rate of methane over the catalysts correlates positively with the temperature in the reaction chamber and negatively with the water content in the inlet gas. Under the same reaction conditions, especially at lower temperature, the oxidative conversion of methane over the catalyst prepared from Pd—X6 is much greater than that over the catalyst prepared from the palladium nitrate solution.

(3) The test data of the oxidative conversion rate of propane over the catalysts prepared by two different palladium compounds under the same conditions are given in Table 4. Similar to the situation of methane, the oxidative conversion rate of propane increases with the rise of the temperature and decreases with the increase of the water. But the influence of water on the oxidative conversion of propane becomes less obvious when the reaction temperature rises, and the conversion rate at 450° C. and above is up to 99.5%. From the conversion rate of propane under the same reaction conditions over the catalysts prepared by the two palladium compounds, it can be still concluded that Pd—X6 is superior to palladium nitrate as the catalytic precursor.

TABLE 3

Oxidative conversion rate of methane over catalysts prepared by using two different palladium precursors

| Reaction temperature/° C. | Water content/% | Conversion rate/% of Methane Pd-X6 | Palladium nitrate solution |
|---|---|---|---|
| 350 | 0 | 58.3 | 1.8 |
| | 5 | 32.2 | 0 |
| | 10 | 22.2 | 0 |
| | 15 | 17.1 | 0 |
| | 20 | 13.2 | 0 |
| 400 | 0 | 71.7 | 26 |
| | 5 | 49.3 | 12.2 |
| | 10 | 41.4 | 10.2 |
| | 15 | 35.7 | 8.6 |
| | 20 | 31.7 | 7.8 |
| 450 | 0 | 85.6 | 55.4 |
| | 5 | 74 | 40 |
| | 10 | 67.9 | 34 |
| | 15 | 63.5 | 28.8 |
| | 20 | 59.8 | 25.6 |
| 500 | 0 | 92.7 | 77.4 |
| | 5 | 88.5 | 69.2 |
| | 10 | 86.1 | 65.2 |
| | 15 | 86 | 61 |
| | 20 | 86.7 | 57.6 |

TABLE 4

Oxidative conversion rate of propane over catalysts prepared by using two different palladium precursors

| Reaction temperature/° C. | Water content/% | Conversion rate/% of Propane Pd-X6 | Palladium nitrate |
|---|---|---|---|
| 350 | 0 | 100 | 81.7 |
| | 5 | 97.8 | 59.2 |
| | 10 | 94.9 | 57.9 |
| | 15 | 91.2 | 57.9 |
| | 20 | 87.5 | 57.8 |
| 400 | 0 | 100 | 98.9 |
| | 5 | 100 | 96.9 |
| | 10 | 99.6 | 96 |
| | 15 | 99 | 95.2 |
| | 20 | 100 | 94.4 |
| 450 | 0 | 100 | 99.86 |
| | 5 | 100 | 99.65 |
| | 10 | 100 | 99.57 |
| | 15 | 100 | 99.46 |
| | 20 | 100 | 99.36 |
| 500 | 0 | 100 | 100 |
| | 5 | 100 | 100 |
| | 10 | 100 | 100 |
| | 15 | 100 | 100 |
| | 20 | 100 | 100 |

Therefore, the catalyst prepared by using the Pd(II) complex of the present disclosure as a catalytic precursor has a significantly better purification effect on VOCs than an industrial catalyst prepared with a palladium nitrate solution as a precursor.

What is claimed is:

1. A water-soluble Pd(II) complex, wherein the water-soluble Pd(II) complex has a chemical name ammonium dinitrooxalato palladium (II) hydrate and a molecular formula of $(NH_4)_2[Pd(NO_2)_2(C_2O_4)]\cdot nH_2O$, and has the following chemical structural formula:

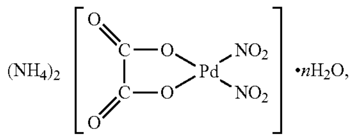

wherein n is the number of crystal water, equal to 1 or 2.

2. A method for synthesizing the water-soluble Pd(II) complex of claim 1, comprising the following steps:

i) dissolving $PdCl_2$ or $Pd(NH_3)_2Cl_2$ in ammonium hydroxide to produce $[Pd(NH_3)_4]Cl_2$;

ii) adding excessive $NaNO_2$ into $[Pd(NH_3)_4]Cl_2$ to produce trans-$[Pd(NH_3)_2(NO_2)_2]$; and iii) dissolving trans-$[Pd(NH_3)_2(NO_2)_2]$ in an aqueous solution of oxalic acid to yield the water-soluble Pd(II) complex.

3. The water-soluble Pd(II) complex according to claim 1, wherein the water-soluble Pd(II) complex is a catalytic precursor for preparation of a supported palladium-based catalyst.

* * * * *